UNITED STATES PATENT OFFICE.

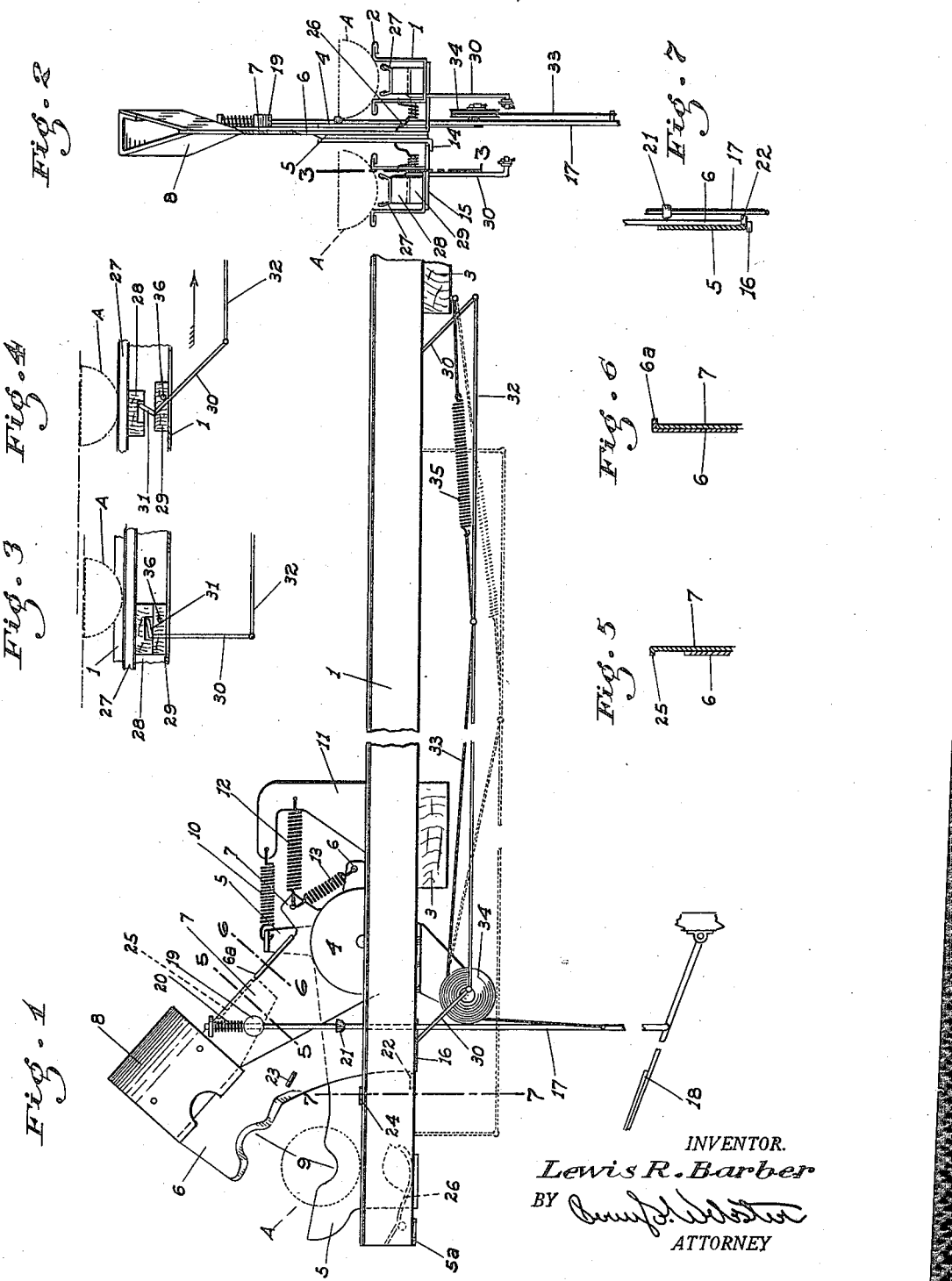

LEWIS R. BARBER, OF FRESNO, CALIFORNIA.

FRUIT-PITTING MACHINE.

1,424,436.　　　　　Specification of Letters Patent.　　Patented Aug. 1, 1922.

Application filed August 1, 1921. Serial No. 488,778.

*To all whom it may concern:*

Be it known that I, LEWIS R. BARBER, a citizen of the United States, residing at Fresno, county of Fresno, State of California, have invented certain new and useful Improvements in Fruit-Pitting Machines; and I do declare the following to be a full, clear, and exact description of the same, reference being had to the accompanying drawings, and to the characters of reference marked thereon, which form a part of this application.

This invention relates to improvements in fruit cutting and pitting machines, with especial reference to the treating of peaches, apricots and similar fruit.

The principal object of the invention is to provide a machine particularly adaptable for individual use, so that the grower, regardless of labor or other conditions, can himself handle the cutting and curing of his crop at the proper stage of ripeness.

Another object is to produce a machine which will cut and pit the fruit many times as fast as the best hand-cutter can work, while the results both in quality and appearance, will be superior, since there is no manual handling of the fruit, other than the placing of the same between the cutting knives, the actual cutting and pitting being carried out mechanically.

I have personally experimented with my machine, and have demonstrated that with the use of the same a peach or the like may be treated in one second, and this speed maintained indefinitely and without hardship to the operator.

A further object is to provide means whereby the halves of the fruit, as they are cut, will all lie in the same order, cut side up, so that it becomes a simple matter to transfer them to drying trays and the like without further handling being necessary.

A further object of the invention is to produce a simple and inexpensive device and yet one which will be exceedingly effective for the purposes which it is designed.

These objects I accomplish by means of such structure and relative arrangement of parts as will fully appear by a perusal of the following specification and claims.

In the drawings similar characters of reference indicate corresponding parts in the several views.

Fig. 1 is a side elevation of the complete machine.

Fig. 2 is a front end view thereof.

Fig. 3 is a fragmentary section taken on a line 3—3 of Fig. 2, showing the means for moving the fruit-halves along as they are cut.

Fig. 4 is a similar view, illustrating this movement as carried out.

Figs. 5, 6 and 7 are fragmentary cross sections taken on lines 5—5, 6—6 and 7—7 respectively of Fig. 1.

Referring now more particularly to the characters of reference on the drawings, the numeral 1 denotes a pair of channel shaped members, spaced apart horizontally, and provided with out-turned flanges 2 at their upper edges.

These channels are rigidly fixed members, and form the frame and support for the mechanism mounted thereon, besides serving another purpose as will hereinafter appear.

The channels themselves may be supported by transverse beams 3 or otherwise.

Fixed to the channels 1 are brackets 4, in which are pivotally mounted in common a lower knife member 5, an upper and co-operating knife member 6 mounted alongside the same, and a stripper 7 mounted alongside the member 6 and provided with a wedge shaped portion 8 on its upper end. The opposed cutting edges of the knives 5 and 6 are each provided with oppositely but co-relatively disposed recesses of notches 9, which when the knives are brought together, outline an area substantially equal to that of the pit of the fruit being handled.

A spring 10 tending to pull the member 5 upwardly is connected thereto and to a fixed bracket 11, a spring 12 similarly mounted is connected to the member 7 and acts likewise thereon, while members 6 and 7 are connected by a spring 13 tending to move said members apart.

Upward movement of the member 5 is limited by a flange 14 thereon engaging a stop 15 on one of the channels.

Member 6 is limited in its upward movement by a flange 16 thereon which abuts against the under side of the member 5, while the member 7 is limited in its upward movement by a flange 6$^a$ on the member 6 against which the upper edge of the member 7 bears.

Movement is preferably imparted to the members 5, 6 and 7 by means of a rod 17 connected at its lower end to a treadle 18 or similar means, this rod passing through a swivel-stud 19 projecting from the member 7 and having a compressive spring 20 above the stud and bearing thereon.

A stop 21 on said rod is adapted to engage a lug 22 on the member 5 after a predetermined amount of downward travel of said rod.

The operation of the device so far is as follows:

A peach "A" for instance is placed on the knife 5 with its major axis in a vertical plane.

The treadle is then depressed, and while the member 5 remains stationary, both members 6 and 7 descend, the member 6, approaching the member 5, cutting the peach all around the circumference, and gripping the pit firmly between 5 and 6.

The knives 5 and 6 then remain stationary to each other, since the knife 5 has so far been held from movement by spring 10 which has a tension greater than 13.

The stripper 7 then moves downwardly, the spring 13 expanding, so that the wedge portion 8 moves between the cut halves of the fruit, causing them to fall, cut sides up, to rest on the flanges 2 of the channels 1.

After a predetermined amount of movement of the stripper, the latter is brought to rest on the knife 6 by reason of a flange 25 on the former bearing against the upper side of the latter, and any further movement of treadle downward will move 5, 6, 7 downward together till a lug 23 on 6 comes against a stop 24 on channel 1.

At the same time, the stop 21 has contacted with the lug 22, and any further depression of the treadle will depress the spring 20, and cause the lower knife 5 to move down alone, carrying the fruit-pit below the top of the channel 1 and into contact with a spring or other form of ejector member 26 of suitable construction, downward movement of this knife 5 being limited by a stop 5ª on the channels.

Upon the release of the treadle, the members 5, 6 and 7 then move upwardly to their normal positions, impelled by the various springs, while the spring 20 acts as a cushion to prevent a slamming action.

Were no means then provided to remove the cut fruit, other than by hand, they would be in the way of further cutting operations.

To get the cut halves out of the way, I provide the following structure:—Mounted freely in the channels 1 and adapted for longitudinal sliding movement therein are shallower channels or troughs 27, normally under and free of the fruit resting on the outer channels. These channels 27 are supported on blocks 28 which in turn are supported on blocks 29 slidably mounted in the channels 1, these blocks being at each end thereof. Pivoted onto the blocks 29 are levers 30 having angled arms 31 engaging the under side of the blocks 28, these levers being connected in corresponding pairs by rods 32.

Secured at one end to the rod 32 and at the other end to the treadle link or rod 17 is a cable 33, passing over a pulley 34 journaled onto one of the channels 1. A spring 35 connected to the rod 32 and to one of the channels 1 or beams 3 is acting to draw the said rod in the opposite direction from that imparted thereto by a pull on the cable.

In the operation of this mechanism, with the treadle in the position shown and the knives ready to receive a piece of fruit, the spring 35 has acted to move the levers 30 to the right. This has caused the arms 31 thereon to raise the blocks 28, raising the channels 27 likewise so that they, instead of the channel 1, then support the fruit.

Swinging movement of the levers is limited by stops 36 on the blocks 29, so that the further strength of the spring 35 is then exerted to draw the levers, blocks and channels 27, bodily along lengthwise of the channel 1.

The movement thus had and permitted is sufficient to move the channels 27 along a distance slightly greater than the length of the peach, the channel being made of such an overall length as to accommodate any desired number at a time, at which time the channels 27 may be each in turn lifted by the hands and the fruit thereon brought nearly in place over the drying tray, and the channel tipped to cause the fruit to slide onto the drying tray in neat rows placed closely together till the tray is full.

Now when the treadle is depressed, the cable is pulled, and the levers first resume their normal positions, lowering the troughs 27 away from the fruit, which again rests on the channels 1, but in a new position as described. Further movement of the treadle moves the levers, blocks and troughs 27 bodily forward to their original position, to await another raising and rearward movement with the release of the treadle.

It will of course be understood that with each upward lift of the troughs, all the fruit is also raised each time and moved simultaneously with the newly cut halves, until the limit of capacity has been reached, at which time the fruit is placed on the drying tray as above described and the empty channels replaced in position on the machine.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A fruit cutting and pitting machine including a pair of co-operating knives, the fruit being placed between said knives, channels on each side of the knives adapted to receive the cut fruit thereon, and means for causing the cut halves to rest cut side up on said channels.

2. A fruit cutting and pitting machine including a lower knife, an upper knife adapted to co-operate therewith, the fruit being placed between said knives, channels on each side of the knives adapted to receive the cut fruit thereon and means operated in connection with the knives for causing the cut halves of the fruit to be spread apart and to then lie on the channels.

3. A fruit cutting and pitting machine including a pair of co-operating knives arranged to receive the fruit to be cut therebetween, stripping means arranged to move the cut halves of the fruit away from the knives, the pit being retained thereby, a stationary pit-ejector, and a commonly actuated means for operating the knives and the stripper, and for then moving the knives into the plane of the ejector and to allow the pit to be removed thereby.

4. A fruit cutting and pitting machine including a pair of co-operating knives, the fruit being placed between said knives, a stripper, and a common means for bringing the knives together to cut the fruit into halves and for then actuating the stripper to cause the latter to separate the cut halves.

5. A fruit cutting and pitting machine including a lower knife, an upper knife adapted to co-operate therewith, the fruit being placed between said knives, and the latter having notches adapted to surround the pit of the fruit, means for bringing the knives together to halve the fruit, and means whereby the under knife may then be moved clear of the upper knife to allow the pit to be ejected.

6. A fruit cutting and pitting machine including a lower knife, an upper knife adapted to co-operate therewith, the fruit being placed between said knives and the latter having notches adapted to surround the pit of the fruit, means for bringing the knives together to halve the fruit and for subsequently moving the lower knife away from the upper knife, and an ejector positioned to receive the pit after such movement of the lower knife has taken place.

7. A fruit cutting and pitting machine comprising a lower knife, an upper knife adapted to co-operate therewith, a stripper mounted above the upper knife, both knives and stripper being mounted in common and arranged for movement with respect to each other, means whereby the upper knife and stripper will first move in unison toward the lower knife, means whereby the stripper will then move downwardly while the knives remain stationary, and means whereby the lower knife will then move away from the upper knife while the latter knife and stripper remain stationary.

8. A fruit cutting and pitting machine comprising a lower knife, an upper knife adapted to co-operate therewith, a stripper mounted above the upper knife, both knives and stripper being mounted in common and arranged for movement with respect to each other and means whereby when downward pressure is applied to the stripper the latter and the upper knife will first move in unison toward the lower knife, the stripper will then move downwardly while the knives remain stationary, and the lower knife will then move away from the upper knife while the latter and the stripper remain stationary.

9. A fruit cutting and pitting machine comprising a lower knife, an upper knife adapted to co-operate therewith, a stripper mounted above the upper knife, both knives and stripper being mounted in common and arranged for movement with respect to each other and means whereby when downward pressure is applied to the stripper the latter and the upper knife will first move in unison toward the lower knife, the stripper will then move downwardly while the knives remain stationary, and the lower knife will then move away from the upper knife while the latter and the stripper remain stationary and means for returning the knives and stripper to their normal positions when the pressure is removed.

10. A fruit cutting and pitting machine comprising a lower knife, an upper knife adapted to co-operate therewith, a stripper mounted above the upper knife, both knives and stripper being mounted in common and arranged for movement with respect to each other, an operating rod adapted to be pulled downward yieldably connected to the stripper, yieldable means connecting the stripper and upper knife for first allowing a movement in unison toward the lower knife, and then a downward movement of the stripper alone, stop means for then preventing further downward movement of the upper knife and stripper, a stop on the rod, and a lug on the lower knife then engaged by said stop, whereby the lower knife may then be lowered with the yielding of the connection of the rod with the stripper.

11. In a fruit cutting machine, a cutting mechanism, channels arranged in connection therewith and arranged to receive the fruit thereon as it is cut, and means for moving the cut fruit lengthwise of the channels and away from the plane of the cutting mechanism between each cutting operation.

12. In a fruit cutting machine, a cutting mechanism, channels arranged in connection therewith and arranged to receive the fruit thereon as it is cut, means whereby the fruit so deposited may be moved along the channels and away from the plane of the cutting mechanism prior to a subsequent cutting operation, and a commonly actuated means for operating the cutter mechanism and the fruit moving means.

13. In a fruit cutting machine, a cutting mechanism, channels arranged in connection therewith and arranged to receive the fruit thereon as it is cut, troughs in the channels normally free of the fruit supported thereby, and means for raising said troughs to support the fruit and for then moving said troughs lengthwise of the channels and again lowering said troughs to deposit the fruit on the channels in a new position.

14. In a fruit cutting machine, a cutting mechanism, channels arranged in connection therewith and arranged to receive the fruit thereon as it is cut, troughs in the channels normally free of the fruit supported thereby, means for operating the cutting mechanism, the latter then returning automatically to an open position prior to another cutting operation, and means whereby with such return operation the troughs will be raised to support the fruit just cut and will then be moved lengthwise of the channels; and with a subsequent operation of the cutting mechanism the troughs will be lowered to deposit the fruit on the channels in a new position and will then be moved lengthwise thereof in the opposite direction to the first movement thereof.

15. In a fruit cutting machine, a cutting mechanism, channels arranged in connection therewith and arranged to receive the fruit thereon as it is cut, troughs in the channels normally free of the fruit supported thereby, means for operating the cutting mechanism, the latter then returning automatically to an open position prior to another cutting operation, and means whereby with such return operation the troughs will be raised to support the fruit just cut and will then be moved lengthwise of the channels; and with a subsequent operation of the cutting mechanism the troughs will be lowered to deposit the fruit on the channels in a new position and will then be moved lengthwise thereof in the opposite direction to the first movement thereof, and a means actuated in common with the cutter operating means for so moving the troughs.

16. In a fruit cutting machine, a cutting mechanism, channels arranged in connection therewith and arranged to receive the fruit thereon as it is cut, means for operating the cutting mechanism, the latter then returning to an open position prior to another cutting operation, and means whereby with such return movement the fruit just cut will be moved to another position on the channels.

In testimony whereof I affix my signature.

LEWIS R. BARBER.